United States Patent [19]
Kreuzer

[11] Patent Number: 5,026,017
[45] Date of Patent: Jun. 25, 1991

[54] APPLIANCE CARRIER

[75] Inventor: Friedhelm Kreuzer, Munich, Fed. Rep. of Germany

[73] Assignee: F.M.K. Kruezer GmbH & Co., Benzstrabe, Fed. Rep. of Germany

[21] Appl. No.: 520,510

[22] Filed: May 8, 1990

[30] Foreign Application Priority Data

May 24, 1989 [DE] Fed. Rep. of Germany ....... 3916975

[51] Int. Cl.⁵ ............................................. A47H 1/10
[52] U.S. Cl. .................................................. 248/324
[58] Field of Search ............... 248/323, 324, 326, 327, 248/333, 669, 295.1, 282, 283, 289.1

[56] References Cited

U.S. PATENT DOCUMENTS

| | | | |
|---|---|---|---|
| 2,659,827 | 11/1953 | Scag et al. | 248/326 X |
| 3,164,355 | 1/1965 | Seitz et al. | 248/324 |
| 3,556,455 | 1/1971 | Storm et al. | 248/333 |
| 3,776,500 | 12/1973 | Foderaro | 248/333 |
| 4,673,154 | 6/1987 | Karapita | 248/327 X |
| 4,836,494 | 6/1989 | Johnsen | 248/295.1 X |
| 4,901,967 | 2/1990 | Petre | 248/327 |

FOREIGN PATENT DOCUMENTS 3232131 11/1983 Fed. Rep. of Germany.
8404710 5/1984 Fed. Rep. of Germany.

Primary Examiner—Ramon O. Ramirez
Attorney, Agent, or Firm—Donald Brown

[57] ABSTRACT

An appliance carrier for use in particular with supports for appliances in a hospital is adapted for mounting appliance receiving supports in an adjustable height. To this end an extension arm of the carrier comprises a profiled portion having grooves extending in longitudinal direction of the carrier on two opposite sides thereof. The grooves receive a respective support member for connection with a carrier member. The support members are slidable in the respective grooves.

5 Claims, 2 Drawing Sheets

APPLIANCE CARRIER

BACKGROUND OF THE INVENTION

The invention relates to an appliance carrier comprising an extension arm for receiving appliance support members and supply lines for operating the appliances or the like. Such appliance carriers are in particular used for receiving medical appliances. A particular form thereof are so called overhead or wall supports.

An appliance carrier or support of this kind is for example disclosed in the German patent application 36 27 517. Appliance carriers formed as support arms are mounted to extension arms and support members for receiving the appliances are provided in a predetermined level at the support arms. The appliance carriers in form of the support arms are tubular. The supply lines are passed through the interior of these tubes and freed therefrom at a predetermined point for connection to the appliances to be received. The carrying members are rigidly fixed to the support arms.

The German patent 32 32 131 discloses an appliance carrier which has a plurality of grooves extending in longitudinal direction of the carrier on two opposite sides thereof. The grooves provide for the longitudinally displaceable mounting of components to be connected. No displaceable carrier members are provided for hooking-in support members.

OBJECTS OF THE INVENTION

It is an object of the invention to provide an improved appliance carrier in which the above mentioned drawbacks are avoided. It is a further object to provide an appliance carrier of the above described kind, in particular in the form of support arms, which allows an easy mounting or removal of carrier members to or from, respectively, the support member. It is a still further object of the invention to provide an appliance carrier in which the relative height or level of the carrier members can easily be adjusted.

SUMMARY OF THE INVENTION

According to the invention the appliance carrier comprises an arm for carrying support members for appliances and supply lines for operating the appliances, a carrier having two opposite sides and two grooves on each of the opposite sides, the grooves being parallel and extending in longitudinal direction of the carrier, carrier members slideably received in the respective grooves and support members having forked arms formed to rest on the associated carrier members at their end adjacent to the support member and to grip below the other carrier members with their respective other end.

BRIEF DESCRIPTION OF DRAWINGS

Further advantages, features and objects of the invention will stand out from the following description of an examplary embodiment with reference to the drawings. In the drawings

DESCRIPTION OF A PREFERRED EMBODIMENT

Figure 1:
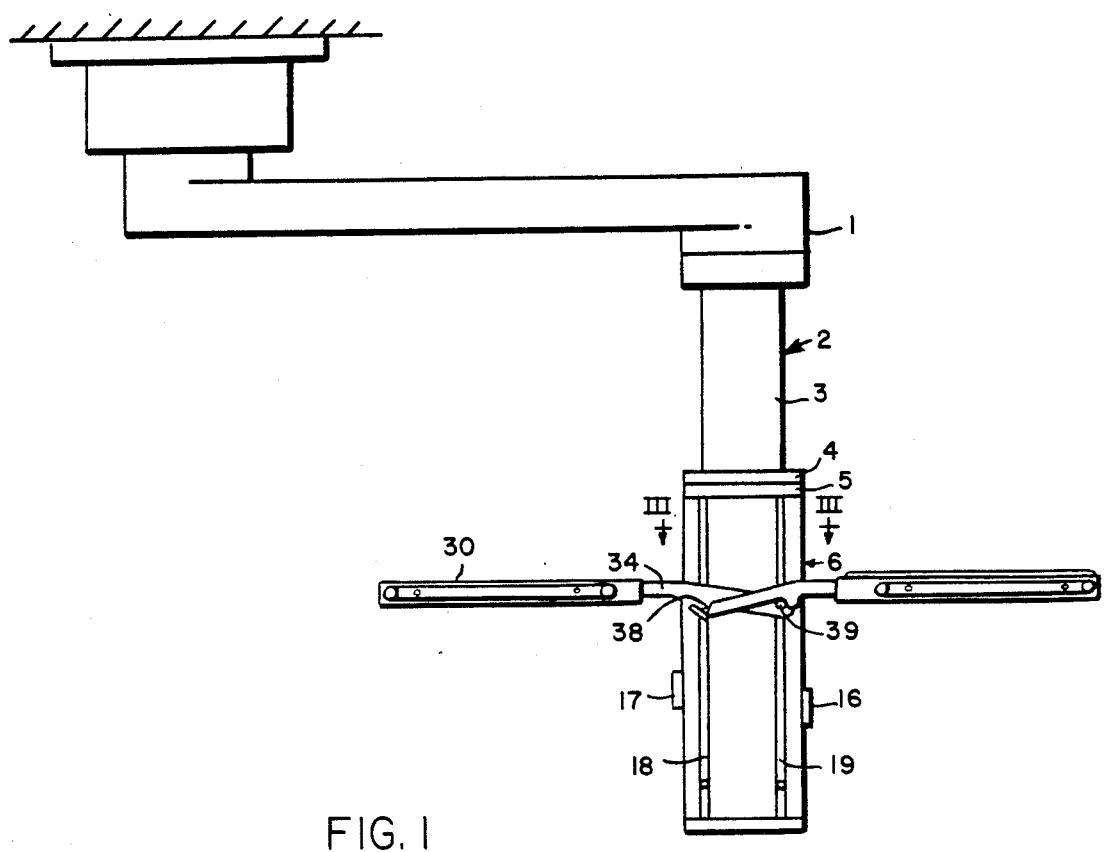
FIG. 1 is a schematic representation of a support with an appliance carrier.

The support shown in FIG. 1 comprises an extension arm 1 with an appliance carrier 2 carried by the arm 1. The appliance carrier comprises a columnar portion 3 connected to the extension arm and a profiled or profile-shaped portion 6 connected to the columnar portion 3 through flanges 4, 5.

Figure 2:
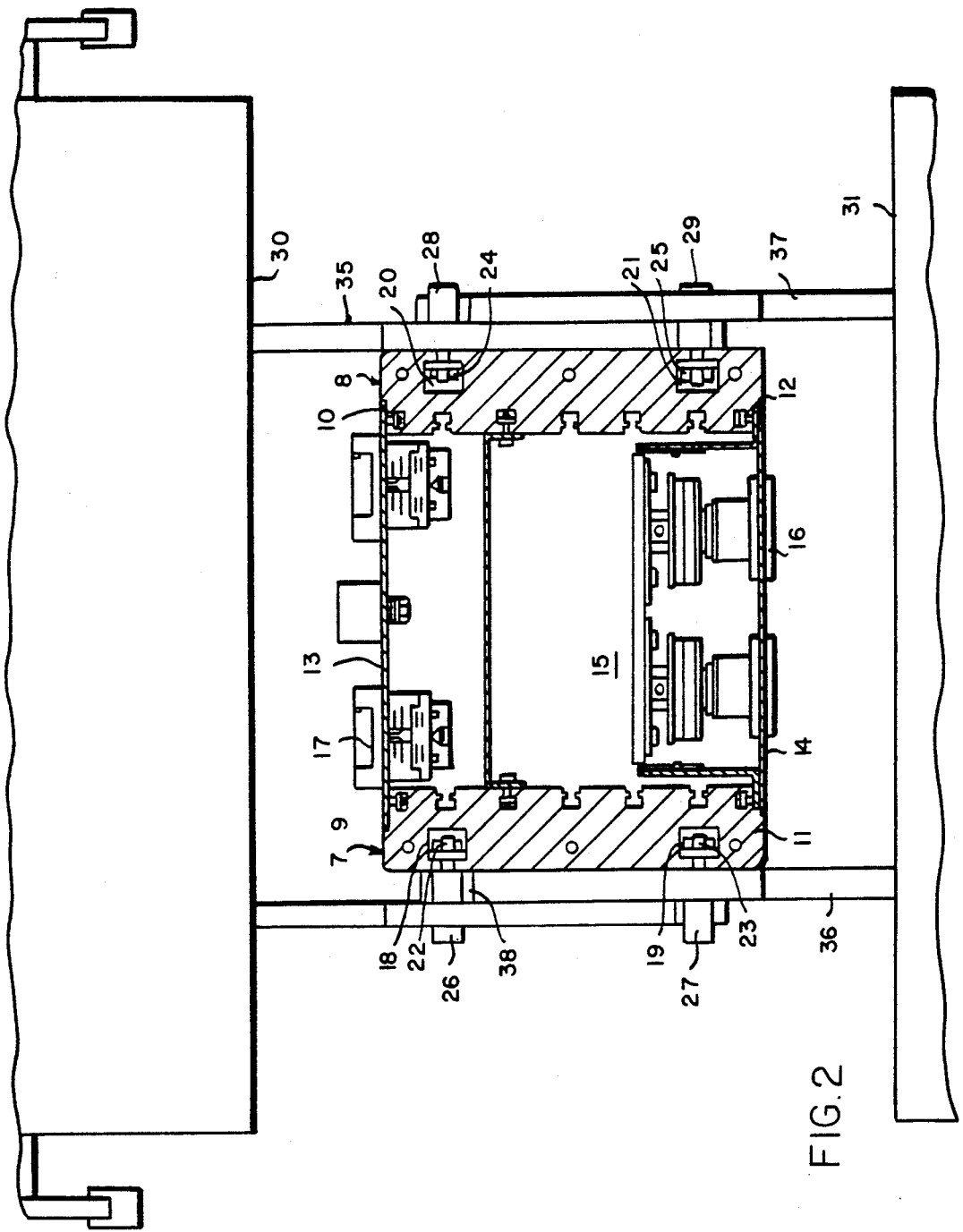
FIG. 2 is a sectional representation along a section line III—III on an enlarged scale.

As may be best seen from FIG. 2 the profiled portion comprises two mutually parallel walls 7, 8.

The walls have recesses 9–12 at their respective facing ends or corners of the end faces. Wall members 13, 14 extending transversely to the walls 7, 8 are inserted into the recesses and screwed to the walls such that the walls together with the wall members enclose a channel 15 for passing supply lines therethrough to connections 16, 17 provided in the wall members 13 and 14.

Each wall 7, 8 has, at the outer wider longside thereof, spaced T-shaped grooves 18–21 extending parallel to the lateral edges of the walls and in a short distance therefrom or, in other words, close to the respective lateral edges. All four grooves run parallel to each other and to the axis of the channel and thus also parallel to the axis of the appliance carrier itself.

At least one respective nut 22–25 is provided in each of the grooves, the nut being slideable along the respective groove. The nuts co-operate with respective screws 26–29 having a bolt-shaped portion to form a carrier member. The carrier member can be adjusted in height or level along the groove by loosening the screw. In such a manner the carrier members can be adjusted in height along the total length of the grooves 18, 19 such that supports 30, 31 to be mounted thereto can be put into engagement with the carrier members. Each support has a forked pair of arms 34–37 provided at the side thereof which is to be connected to the appliance carrier. Each arm has a slot 38 provided at the upper side of the free end thereof. The dimensions of the slot are selected such that it fits the screw 27 to be brought into engagement therewith. In a distance corresponding to the distance between the two grooves 18, 19 the lower side of the supports has a recess 39 receiving the associated screw 26. As may be best seen from FIG. 1 the free end of the support is inclined relative to the platform of the support such that the upper slot 38 and lower recess 39 lay in a plane parallel to the platform when this platform is horizontal.

In operation four carrier members are arrested in the corresponding height or level for each desired height of a support. Subsequently the platform or support is fastened in that the free ends of the fork grip the remote carrier members from below and the ends of the fork adjacent to the platform rest on the second pair of carrier members. As evident from the figures the carrier members are dimensioned for engagement of a respective opposite pair of supports.

As may be seen from FIG. 2 the recesses 9–12 are also formed as T-shaped grooves extending parallel to the axis of the channel such that the mounting of the wall members 13, 14 is facilitated by screws which are displaceable along the grooves.

As further evident from FIG. 2 the two walls 7, 8 have T-shaped grooves provided on their facing inner sides such that level-adjustable fittings or the like may be mounted also within the interior of the channel.

Although the invention has been described with reference to a specific example embodiment, it is to be understood that it is intended to cover all modifications an equivalents within the scope of the appended claims.

What is claimed is:

1. An appliance carrier comprising an arm for carrying support members for appliances and supply lines for operating the appliances, the carrier having two opposite sides and two grooves one each of the opposite sides, said grooves extending parallel and in longitudinal direction of the carrier, carrier members slidably received in the respective grooves, and support members having forked arms, formed to rest on said carrier members adjacent to the respective support member, and to grip below said carrier members with the ends of said arms.

2. The appliance carrier of claim 1, wherein the forked arms are formed such that two respective support members can be mounted to the same or a single set of carrier members.

3. The appliance carrier of claim 1, wherein the carrier comprises two walls formed as profiled parts and two wall members extending transversely thereto and connecting the walls such that the profiled parts and the wall members enclose a channel for supply lines.

4. The appliance carrier of claim 1, wherein the grooves have a T-shaped cross-section.

5. The appliance carrier of claim 3, comprising T-shaped grooves for mounting fittings disposed at the facing inner sides of the two walls and extending in longitudinal direction of the carrier.

* * * * *